United States Patent [19]

Kemplin

[11] Patent Number: 4,593,308
[45] Date of Patent: Jun. 3, 1986

[54] AUTOMATIC CORRECTION OF CENTERING AND CONVERGENCE ERRORS IN CRT DISPLAYS

[75] Inventor: Steven C. Kemplin, Virginia Beach, Va.

[73] Assignee: General Electric Company, Portsmouth, Va.

[21] Appl. No.: 604,567

[22] Filed: Apr. 27, 1984

[51] Int. Cl.⁴ .................... H04N 17/02; H04N 17/00; H01J 29/70

[52] U.S. Cl. ...................................... 358/10; 358/139; 315/368

[58] Field of Search ............................ 358/10, 139, 69; 315/13.1, 13.11, 368, 370

[56] References Cited

U.S. PATENT DOCUMENTS

| | | | |
|---|---|---|---|
| 3,479,448 | 11/1969 | Kollsman | 358/10 X |
| 3,962,722 | 6/1976 | Ciciora | 358/10 |
| 4,001,877 | 1/1977 | Simpson | 358/10 |
| 4,035,834 | 7/1977 | Drury | 358/10 |
| 4,364,079 | 12/1982 | Pons | 358/10 |
| 4,485,394 | 11/1984 | Ghaem-Maghami et al. | 358/10 |
| 4,551,748 | 11/1985 | Mattle | 358/10 |

FOREIGN PATENT DOCUMENTS 0099882  7/1980  Japan ......................................... 358/10

Primary Examiner—Michael A. Masinick
Assistant Examiner—Michael P. Dunnam

[57] ABSTRACT

An improved system for the automatic correction of centering and convergence errors in a cathode ray tube display is disclosed. The system includes a first masked light sensor (12) positioned on the major axis of the display and a second masked light sensor (14) positioned on the minor axis of the display. A light blip generator (16) is responsive to the horizontal and vertical timing pulses for unblanking the video circuits during the horizontal and vertical blanking intervals in order to generate light pulses in the vicinities of said first and second light sensors. A microprocessor based feedback controller (10) is responsive to the outputs of the light sensors and programmed to iteratively generate correction signals whenever no output is received from one or both of the light sensors.

4 Claims, 8 Drawing Figures

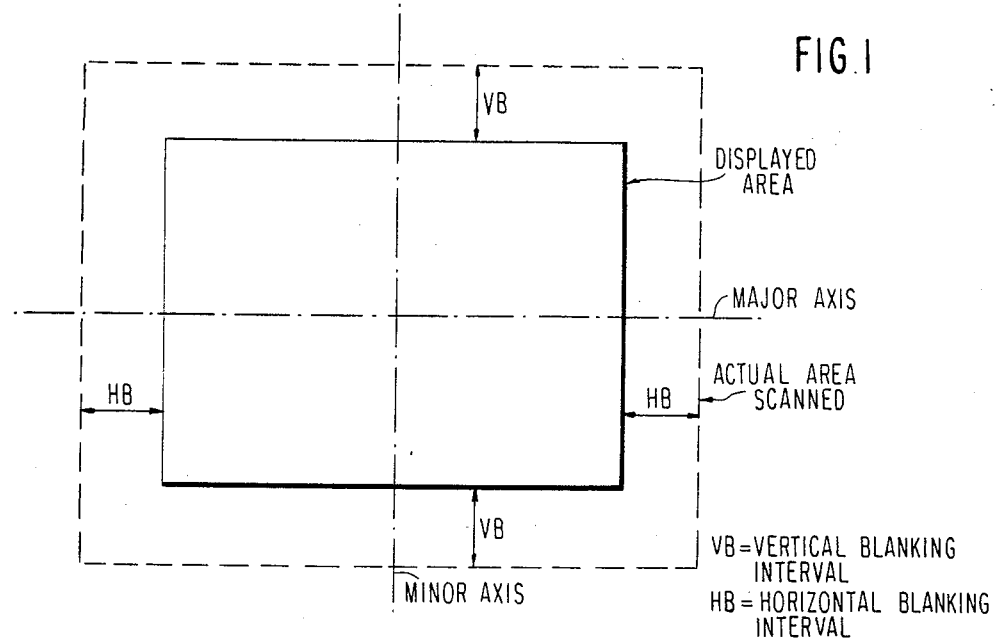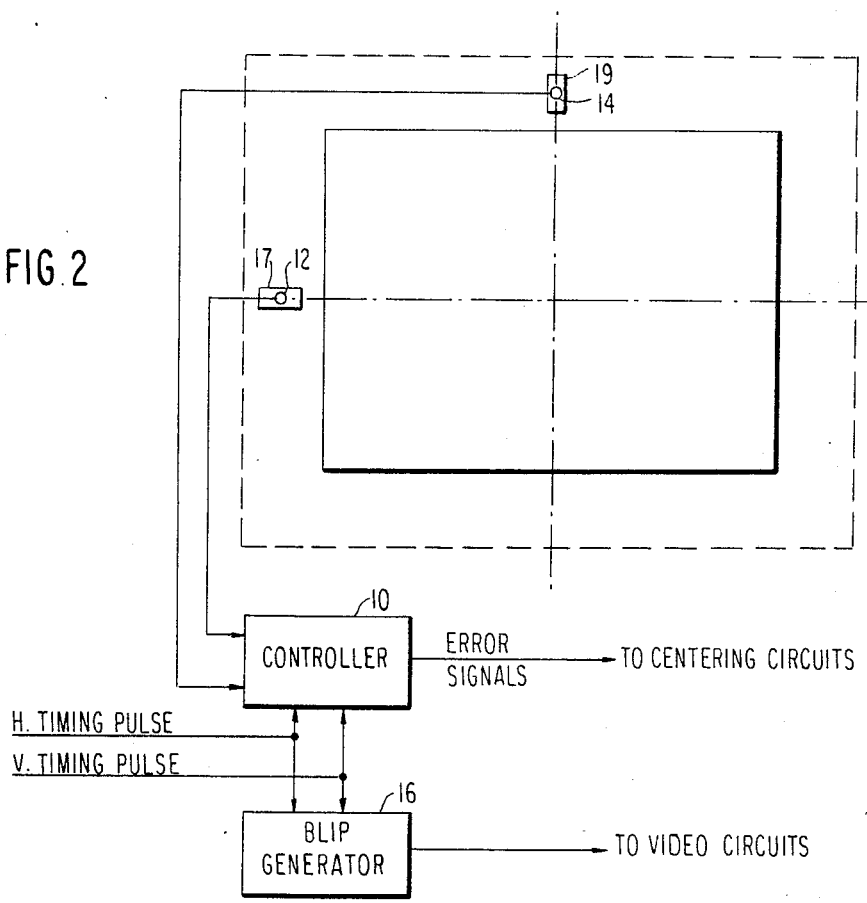

AUTOMATIC CORRECTION OF CENTERING AND CONVERGENCE ERRORS IN CRT DISPLAYS

RELATED APPLICATION

The present application is related to application Ser. No. 423,906 filed Sept. 27, 1983, (now U.S. Pat. No. 4,485,394) by Sanjar Ghaem-Maghami and Howard Eugene Holshouser entitled "Automatic Convergence and Gray Scale Correction for Television Receivers and Projection Television Systems" and assigned to the assignee of this application.

BACKGROUND OF THE INVENTION

The invention generally relates to the correction of centering and convergence errors in cathode ray tube (CRT) displays, and more particularly to a method and apparatus for the automatic correction of such errors during normal operation of the display.

CRT displays, whether they be monitors, television receivers or projection systems, periodically require adjustments to be made to maintain proper centering of the displayed image. Color CRT displays of the type having three cathode ray beams and a screen with a mosaic of phosphor dots or stripes of recurring groups of three colors must be adjusted to maintain the convergence of the three beams over the visible surface of the screen. An analogous adjustment must be made for projection displays employing three projection CRTs. These adjustments are initially made at the factory, but with age, temperature and other environmental conditions, it is necessary to readjust centering and convergence in order to maintain the quality of the displayed image. Ordinarily this is accomplished by a skilled technician with test instruments. The test instruments used to measure convergence often resort to the use of an appliance that is placed over the CRT screen to facilitate detection of the landing point of the cathode ray beam. Such an appliance obscures the screen, and therefore these instruments are not intended to be used simultaneously with the viewing of the display. Examples of such instruments are U.S. Pat. No. 4,001,877 issued to Theodore Frederick Simpson and U.S. Pat. No. 4,035,834 issued to Anthony M. Drury.

The Simpson patent describes a test instrument that employs a photosensitive array comprising a plurality of individual photo cells, this array being placed over the CRT screen. Further, a special post-deflection coil is required to introduce magnetic fields in the region just forward of the deflection yoke to displace the scanned beams in a controlled pattern from their normal landing points on the screen. The displaced beam causes the emission of an error color, the intensity of which is measured by those photo cells which are sensitive to the error color emitted. The intensity of a reference color emitted by the phosphor deposits stimulated by the undisplaced beam is then measured, and the ratio of the error color to the reference is calculated for each measurement location on the screen. The largest ratio is displayed as an indication of the color purity tolerance of the CRT. The Simpson test instrument is used primarily as a quality control device in the manufacture of color CRTs.

The patent to Drury describes a beam landing indicator for a color CRT which also employs a holder for positioning a plurality of photo cells over the screen of the CRT. While the Drury instrument does not require a special deflection coil, it does employ a special deflection generator in order to produce a clockwise rotation of the beam landing shift of the beam. This rotation is stepped in increments which occur once each vertical field of the television raster. Light variations sensed by the photo cells are combined with a reference signal to control the dot location on an oscilloscope display of the vector beam landing error. The technician can then make purity adjustments and yoke adjustments of the CRT by observing the oscilloscope display.

Automating the adjustment of color television receivers is also known. An example is described in U.S. Pat. No. 3,962,722 issued to Walter S. Ciciora. More specifically, the Ciciora patent describes a color television setup apparatus for use in a factory. Once again, a holder positions a plurality of photo cells over the CRT screen in such a manner as to obscure the view of the screen. Patterns indicative of the characteristics of contrast, brightness, color and tint are displayed on the CRT. The photo cells develop corresponding electrical signals which are supplied to circuitry that energizes a plurality of bi-directional motors that are engageable with the receiver contrast, tint, brightness and color level adjustment elements.

While the systems described by Simpson, Drury and Ciciora are useful in a factory or shop environment, what is needed is an automatic means for adjustment of convergence which is part of the CRT display. In this way, the display would be continuously maintained in proper adjustment for optimum viewing. Such a system has been provided in the above-referenced application Ser. No. 423,906 (now U.S. Pat. No. 4,485,394) filed by Ghaem-Maghami and Holshauser. According to that invention, a system is provided for the automatic correction of convergence and gray scale which employs light sensors, either singly or in an array, on or adjacent to the beam landing surface of a CRT or on or adjacent the screen of a projection receiver. The sensors can be placed proximate the overscanned area of the raster such that they are outside the normal viewing area, or in the viewing area if the sensors are made sufficiently small. In the vicinity of a sensor, two of the three cathode ray tubes or electron guns are blanked. As the light beam, in the case of a projection system, crosses the sensor, an output is produced. This output is processed to obtain accurate timing characteristics. Since the position of the sensor is known in terms of counts in both the vertical and horizontal directions, error signals can be developed by comparing the timing of the sensor output with the proper count. These error signals are used to develop vertical and horizontal correction signals to correct the convergence of the one cathode ray tube or gun. The process is then repeated for the remaining two cathode ray tubes or guns. The output of the sensor is also amplified by gated amplifiers for each of the cathode ray tubes or guns in sequential order, and the outputs of these amplifiers are compared to a preset value to develop error signals. These error signals are used to set gun drives to correct the gray scale.

The system described in application Ser. No. 423,906 (now U.S. Pat. No. 4,485,394) filed by Ghaem-Maghami and Holshauser generally operates well under most conditions; however, that system is affected by a change in picture size due to a change from a dark scene to a light scene, a change in line voltage, or a change in the blanking pulse transmitted by the television station, for example. The system is sensitive to both the amplitude and speed (slope) of the incoming light pulse. So while the system according to Ghaem-Maghami and Holshauser operates satisfactorily, it is nevertheless desirable to improve on the performance of that system.

SUMMARY OF THE INVENTION

It is therefore an object of the present invention to provide a system for the automatic correction of centering errors in cathode ray tube displays which is substantially insensitive to the amplitude and slope of the outputs from the light sensors.

It is another object of the invention to provide an improved system for the automatic correction of convergence errors in color cathode ray tube displays which accomplishes the convergence correction within a high degree of accuracy.

According to the present invention, two or more light pulses are generated in the vertical and horizontal blanking intervals. A corresponding number of optical sensors are positioned about the periphery of the viewable display to receive the light pulses. The outputs of these optical sensors are connected to a feedback-type controller. The controller corrects for centering errors by producing an error signal which alters the centering of the displayed image until the light pulses fall on the sensors. When the process is applied to all three colors sequentially, static convergence errors are corrected. If, in addition, information about the width and height of the actual scan is known, a device which can correct the instantaneous position of the beam is used, and a multiplicity of light pulses and sensors are used, dynamic convergence correction can also be accomplished. The present invention accomplishes a similar objective to that of the invention disclosed in Ser. No. 423,906 (now U.S. Pat. No. 4,485,394) filed by Ghaem-Maghami and Holshauser; however, this invention accomplishes that objective in a different way.

BRIEF DESCRIPTION OF THE DRAWINGS

The invention will be better understood from the following detailed description of the invention with reference to the drawings, in which:

FIG. 1 is a plan view of a CRT display showing the relationship between the displayed area and the actual area scanned;

FIG. 2 is a block diagram of a basic embodiment of the invention employing two optical sensors and a feedback-type controller;

DETAILED DESCRIPTION OF THE INVENTION

Figure 3:
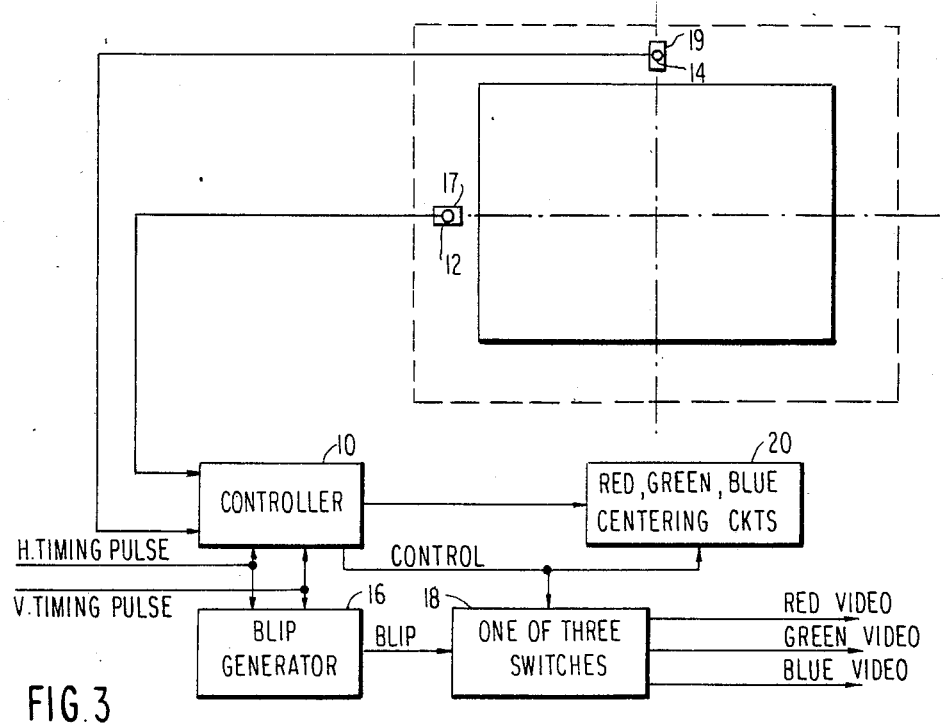
FIG. 3 is a modification of the system shown in FIG. 2 for accomplishing static convergence corrections.

In a raster-scan CRT display, the electron beam actually scans past the edges of the displayed image, but it is normally blanked during this time. This is illustrated in FIG. 1 where the arrows VB indicate the vertical blanking intervals and the arrows HB indicate the horizontal blanking intervals. Notice also that the display area is bisected horizontally by a major axis and vertically by a minor axis. It is possible to generate one or more pulses which are timed to occur during the vertical and horizontal blanking intervals. These pulses are used in the present invention to unblank the display and cause the emission of a blip of light. Since this blip occurs during the blanking interval and the displayed image is normally set to fill the entire area which may be seen by the viewer, these light blips would not be seen.

If the centering of the displayed image is changed, the light blips will move along with the image. Thus, if optical sensors are positioned where the blips should fall physically, a feedback-type controller can be implemented which will correct for centering errors by producing error signals which alters the centering of the displayed image until the light blips fall on the optical sensors. A block diagram of this system is shown in FIG. 2 wherein the controller 10 receives as inputs the outputs of masked optical sensors 12 and 14 placed along the major and minor axes, respectively. Horizontal and vertical timing pulses are provided to both the controller 10 and the blip generator 16. In response to these timing pulses, the blip generator 16 provides an output which unblanks the video circuits causing light pulses to be generated at known timing intervals. The rectangles 17 and 19 surrounding the optical sensors 12 and 14, respectively, indicate blips of light produced when the displayed image is properly centered. Since the optical sensors are masked, they provide an output only if the blips of light are physically coincident with the sensors as indicated by the drawing. If the light blips 17 and 19 do not fall on the optical sensors, the controller 10 begins an iterative routine that produces an error signal which is supplied to the centering circuits.

If the process is applied to all three colors sequentially, using the same sensors 12 and 14, static convergence errors will also be corrected. This is accomplished by the system shown in FIG. 3 wherein the output of the blip generator 16 is supplied to a 1 of 3 analog switch 18 that generates in sequence unblanking pulses for the red, green and blue video signals. The output of the controller 10 is supplied, in corresponding sequence, to the red, green and blue centering circuits represented by block 20.

Figure 4:
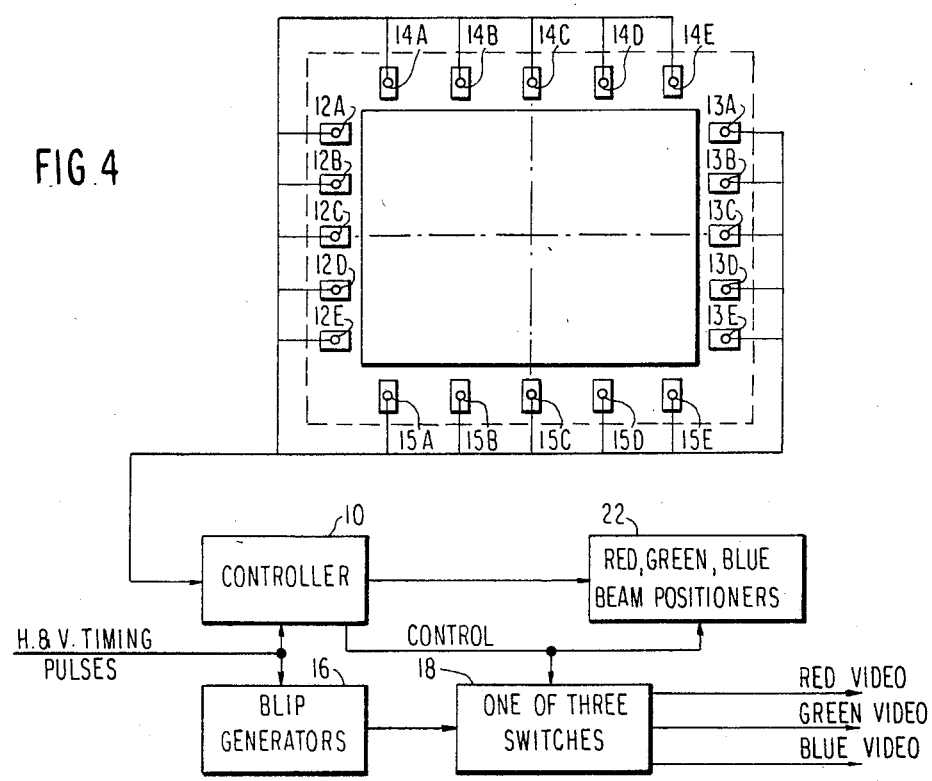
FIG. 4 is a further modification of the basic embodiment employing a plurality of optical sensors with the feedback-type controller for accomplishing dynamic convergence corrections.

If, in addition, information about the width and height of the actual scan is known, a device which can correct the instantaneous position of the beam is used, and a multiplicity of blips and sensors are used, dynamic convergence correction can also be accomplished. Such a system is shown in FIG. 4 wherein a first plurality of vertical optical sensors 12A, 12B, 12C, 12D, and 12E are shown along the left edge of the display, a second plurality of vertical optical sensors 13A, 13B, 13C, 13D, and 13E are shown along the right edge of the display, a first plurality of horizontal sensors 14A, 14B, 14C, 14D, and 14E are shown along the top edge of the display, and a second plurality of horizontal sensors 15A, 15B, 15C, 15D, and 15E are shown along the bottom edge of the display. The outputs of these optical sensors are supplied to the input of the controller 10 which generates an error output to the red, green and blue positioners represented by block 22.

Figure 5:
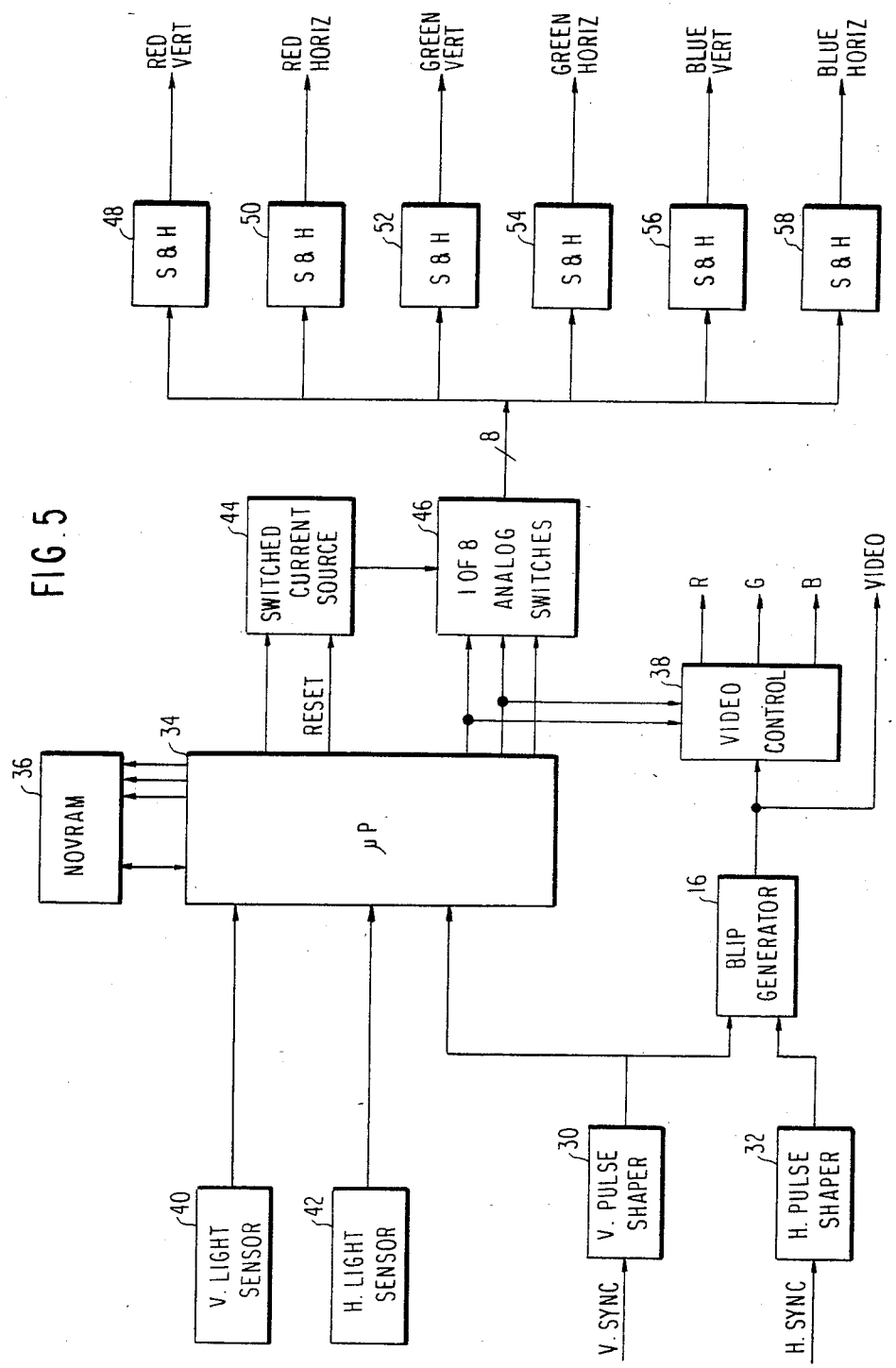
FIG. 5 is a block diagram of a microprocessor based feedback-type controller for the embodiment shown in FIG. 3.

Referring now to FIG. 5, there is shown a microprocessor based feedback controller for the system shown in FIG. 3. Vertical and horizontal sync pulses are supplied to vertical and horizontal pulse shapers 30 and 32, respectively. The outputs of these pulse shapers are provided to the blip generator 16 which is described in more detail hereinafter with reference to FIG. 6. The output of the vertical pulse generator 30 is also supplied to the microprocessor 34 to supply a timing reference. The output of the blip generator 16 is supplied to the video circuits as an unblanking signal and also to the video control 38. The video signal 38 may be the analog switch shown in FIG. 6. Note that a two-bit binary input is supplied to the video control from the microprocessor 34. This two-bit input is used to make the one-of-three switch selection. The vertical and horizontal light sensors 40 and 42 provide inputs to the microprocessor 34 when a light pulse is produced at their respective physical locations on the periphery of the display screen as shown in FIG. 3. If there are no light sensor inputs, the microprocessor 34 begins an iterative process that generates error signals to correct for red, green or blue centering errors as may be appropriate. More specifically, if the light sensors 40 and/or 42 do not receive a pulse of light when they are supposed to, the microprocessor begins a process of ramping up and down to achieve centering and static convergence. This is accomplished by means of the charge pump 44, the one-of-eight analog switch 46 and the sample and hold circuits 48 to 58. These are shown in more detail in FIG. 8.

Figure 6:
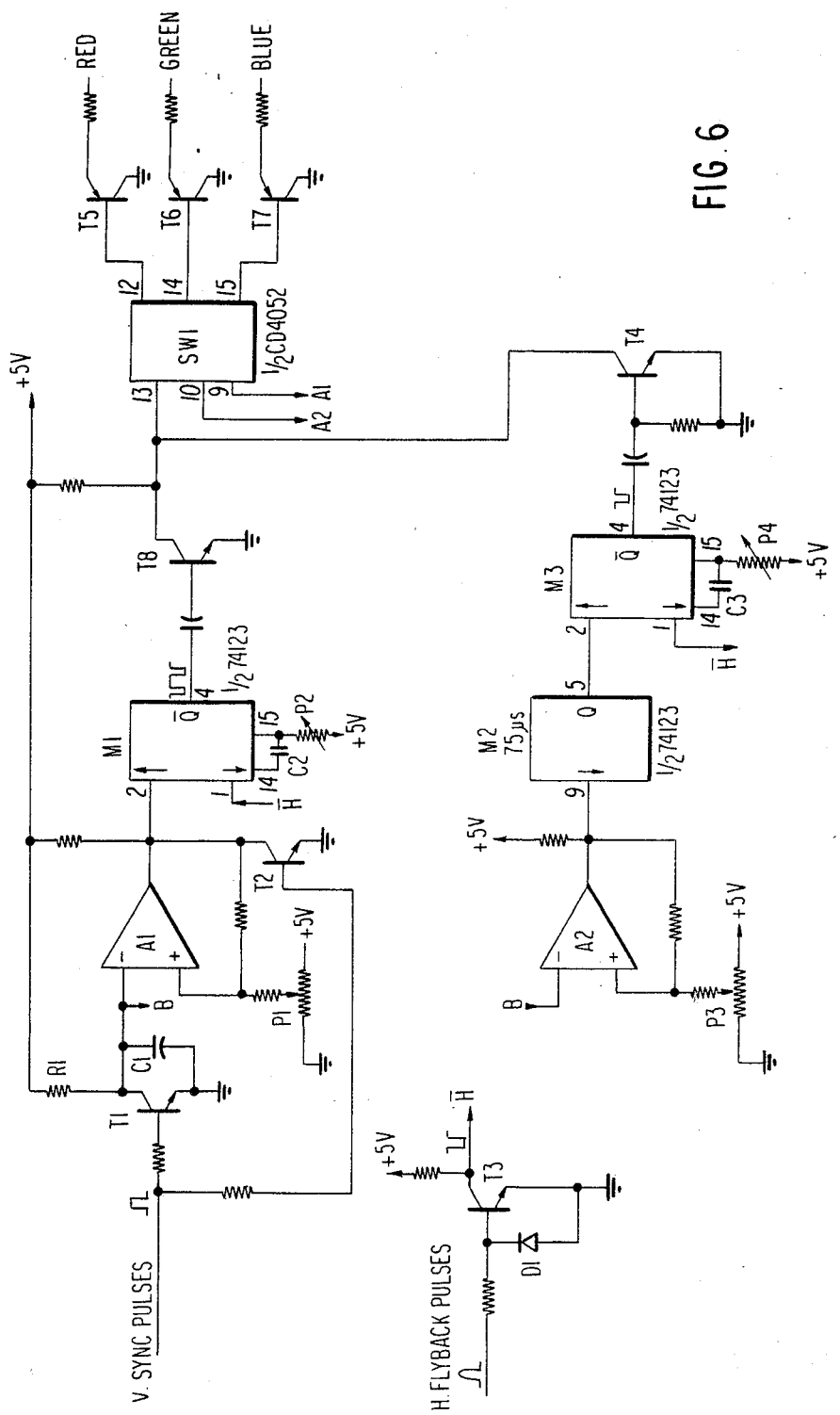
FIG. 6 is a schematic diagram of a blip generator which is used with the controller shown in FIG. 5.

Turning now to FIG. 6, there is shown the blip generator used in the controller system of FIG. 5. The vertical sync pulse is applied to the bases of NPN transistors T1 and T2. A capacitor C1 is connected across the emitter-collector circuit of transistor T1 so that when a positive going vertical sync pulse is applied to the base of transistor T1, the transistor conducts discharging capacitor C1. At the same time, transistor T2 conducts shorting the output of comparator A1 to ground. When the vertical sync pulse ends and transistors T1 and T2 are again nonconducting, capacitor C1 charges from the +5 V supply through load resistor R1. The ramping voltage across capacitor C1 is supplied to the negative input of comparator A1 as an analog timing signal. The positive or reference input to the comparator A1 is connected to the wiper of a potentiometer P1, the winding of which is connected between the +5 V supply and ground. The purpose of potentiometer P1 is to establishe the vertical blip height. Thus, initially during a vertical sync pulse, the output of comparator A1 is forced low by the conduction of transistor T2, but immediately thereafter, the output of the comparator A1 is high. The output of the comparator A1 remains high until the ramping voltage across capacitor C1 exceeds the voltage set by potentiometer P1. In effect, a number of horizontal scans at the beginning of the field is selected by adjusting the potentiometer P1.

The output of comparator A1 is connected to pin 2 of a monostable multivibrator M1 which may be one half of a standard commercial 74123 integrated circuit (IC). A positive voltage on pin 2 enables the monostable M1. The horizontal flyback pulses are supplied to the base of an NPN transistor T3 connected in grounded emitter fashion with a diode D1 connected between the base-emitter circuit. Thus, transistor T3 functions as a clipping inverter. The negative going pulses from the collector of transistor T3 are supplied to pin 1 of the monostable M1. Connected between pin 15 of the monostable M1 and the +5 V supply is a variable resistor P2, and connected between pins 14 and 15 is a capacitor C2. The monostable M1 is triggered by the negative going horizontal timing pulses and times out at a time determined by the RC time constant of P2 and C2. The monostable output goes low immediately and then returns high at the end of the time period determined by P2 and C2. Thus, the monostable M1 produces a negative going pulse having a width determined by the capacitance of capacitor C2. In this way, the monostable M1 provides a series of negative going pulses, one each horizontal scan, as long as it is enabled by a positive output from comparator A1. These pulses are produced at some point along the horizontal scan as determined by the RC time constant P2C2. In other words, adjustment of the potentiometer P2 is made to locate the blip on the minor axis (see FIG. 1) at the top of the display. This blip occurs outside the field of view as determined by the setting of potentiometer P1. When the output of monostable M1 returns to the high state, a pulse is coupled to the base of transistor T8 causing its collector to go low. The width of this pulse is determined by the value of the capacitor in the base of transistor T8 and thereby determines the width of the pulse on the minor axis.

The comparator A2 is similar to comparator A1 receiving as it does the ramping voltage across capacitor C1 at its negative input and a voltage from potentiometer P3 at its positive or reference input. At the beginning of a vertical scan, the output of comparator A2 is positive, but at some point as determined by the setting of potentiometer P3, the output of comparator A2 goes low. The negative going output of comparator A2 triggers monostable M2 which times out after a period of between one and two horizontal scans or about 75 μsec. During this time, the output of monostable M2 is positive and enables monostable M3. This provides a window during which only one negative going horizontal timing pulse from transistor T3 can trigger the monostable M3. Like monostable M1, the monstable M3 is provided with a variable resistor P4 connected between pin 15 and the +5 V supply and a capacitor C3 connected between pins 14 and 15. The RC time constant of P4C3 determines the width of the output pulse. Thus, by adjusting potentiometer P3, the pulse at the left edge of the display can be positioned to fall on the major axis (see FIG. 1), and by adjusting potentiometer P4, the pulse width can be adjusted so as to be outside the field of view.

The negative going pulses from monostables M1 and M3 are capacitively coupled to the bases of NPN transistors T8 and T4, respectively. These transistors serve as drivers and their collectors are connected to pin 13 of an analog switch SW1. The switch SW1 may be one half of a standard commercial CD4052 IC which functions as a one-of-three switch controlled by a two-bit binary code supplied to pins 9 and 10 from microprocessor 34 (see FIG. 5). Switch SW1 connects pin 13 to pins 12, 14 or 15 as determined by the binary code. These pins are, in turn, connected to the bases of NPN transistors T5, T6 and T7 which supply unblanking pulses to the video circuits.

The blip that is generated on the vertical axis requires applying a narrow pulse to the cathode of the electron gun. The width of this pulse, and thus the bandwidth needed in the video circuits, is dependent upon the viewable diagonal measurement (DM), the allowable convergence error (CE), the aspect ratio (AR), and the active scan time (AST). The aspect ratio is defined as the ratio of the width of the displayed image to its height. The actual size of the image is specified as the viewable diagonal. Thus, $AR=h/v$, where h and v are the horizontal and vertical dimensions, respectively, of the displayed image, and DM, h and v forms a right triangle so that $$DM^2 = v^2 + h^2 \qquad (Eq.\ 1)$$

But since $$AR = h/v \qquad (Eq.\ 2)$$

then $$v = \frac{h}{AR} \qquad (Eq.\ 3)$$

Substituting Equation 3 into Equation 1, $$DM^2 = \left(\frac{h}{AR}\right)^2 + h^2 \qquad (Eq.\ 4)$$

Factoring, $$DM^2 = h^2\left(1 + \frac{1}{AR^2}\right) \qquad (Eq.\ 5)$$

Taking the square root of both sides $$DM = h\left(1 + \frac{1}{AR^2}\right)^{\frac{1}{2}} \qquad (Eq.\ 6)$$

or $$h = DM\left(1 + \frac{1}{AR^2}\right)^{-\frac{1}{2}} \qquad (Eq.\ 7)$$

If the sweep is linear, the ratio of the width of the blip to the active scan time is the same as the ratio of the allowable convergence error to h. That is, $$\frac{PW}{AST} = \frac{CE}{h} \qquad (Eq.\ 8)$$

Solving for the pulse width $$PW = CE(AST)/h \qquad (Eq.\ 9)$$

Substituting Equation 7 into Equation 9 and simplifying $$PW = \frac{CE(AST)}{DM}\left(1 + \frac{1}{AR^2}\right)^{\frac{1}{2}} \qquad (Eq.\ 10)$$

Consider the following specific example where the values of the terms are DM=40, AR=1.33, and AST=50 μsec. The allowable convergence error is ±1/32. Thus, $$PW = \frac{(1/32)(50 \times 10^{-6})}{40}\left(1 + \frac{1}{1.33^2}\right)^{\frac{1}{2}} = 48.82\ ns$$

Assuming a Gaussian rolloff, 10%-90%-10% drive leads to $$BW = 2\left(\frac{0.35}{PW}\right) = 14.32\ MHz$$

In contrast, consider the example of the system disclosed by Ghaem-Maghami and Holshouser in application Ser. No. 423,906 (now U.S. Pat. No. 4,485,394). The 3.58 MHz fed to the horizontal counter in that system limits the horizontal resolution:

1/3.58 MHz = 279.3 ns

The active scan time is 50 μs; therefore, each horizontal scan can be divided into $$\frac{50\mu s}{279 ns} = 179\ counts.$$

A 40″ projection receiver has a horizontal screen dimension of 0.8(40)=32 inches. Thus, the finest resolution of which the Ghaem-Maghami and Holshouser system is capable is

32/179 = 0.179″.

In contrast, the present invention is capable of converging to within 1/32″ (0.03125). This represents an improvement in the convergence error of almost six times. Obviously, the digital clocking scheme of Ghaem-Maghami and Holshouser can be improved by increasing the number of bits in the horizontal counter and clocking it at a faster rate. The present invention offers a simpler solution.

Figure 7:
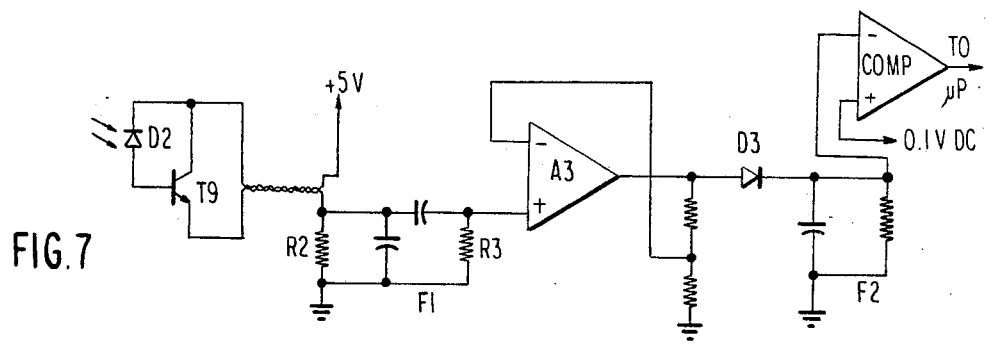
FIG. 7 is a schematic diagram of an optical sensor circuit which is used with the controller shown in FIG. 5.

FIG. 7 shows the light sensor circuit used in the system of FIG. 5. A sensitive photodiode D2 is provided with an aperture (not shown) so that it will respond to the blip of light only if it occurs at the correct physical location. The diode D2 may be a Siemens BPW34 or equivalent and is connected in the base-collector circuit of an NPN transistor T9 having a gain of 200. The collector and emitter leads of transistor T9 are respectively connected by twisted pair to the +5 V supply and a load resistor R2. Thus, the transistor is connected as an emitter follower. The load resistor R2 is part of an RC bandpass filter F1 which is connected to the positive input of operational amplifier A3. Negative feedback for amplifier A3 is derived from an voltage divider to provide a gain of 100. The output of amplifier A3 is connected to a diode D3 followed by a low pass RC filter F2. The diode D3 and the filter F2 function as a peak detector to provide an output pulse to the microprocessor 34 (see FIG. 5) when a blip of light falls on the photodiode D2.

Figure 8:
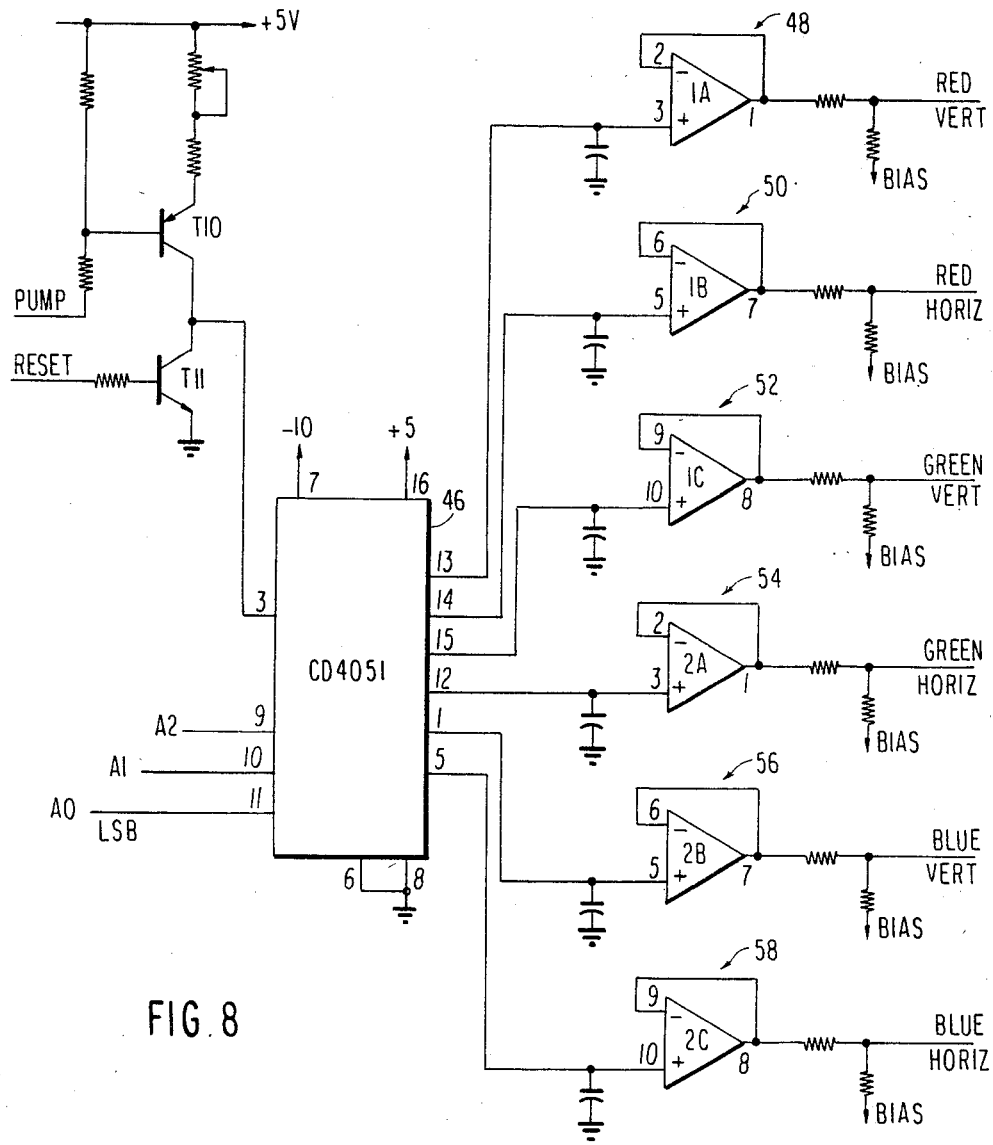
FIG. 8 is a block and schematic diagram of the 1 to 8 analog switch, the switched current source circuit and the sample and hold circuits shown in FIG. 5.

In FIG. 8, the switched current source circuit comprises a transistor T10 which acts as a gated current source. Transistor T11 is used to reset the sample and hold circuits before a charging current is supplied by transistor T10. A 3-bit binary input to the switch 46 from the microprocessor 34 selects one of six output lines to which the junction of the collectors of transistors T10 and T11 is connected. The switch 46 may be implemented with a standard commercial CD4051 IC and functions as a one-of-six analog switch controlled by the three-bit binary code supplied by the microprocessor 34. The six output lines of switch 46 are connected to the inputs of the sample and hold circuits each of which comprises a capacitor and an operational amplifier. Thus, when the microprocessor selects one of the sample and hold circuits, the capacitor for that circuit is first discharged by a reset pulse to the base of transistor T11. Then, the current supplied by transistor T10 charges the selected capacitor to a voltage determined by the duration of the pump pulse from the microprocessor 34 so that a correcting voltage is supplied at the output of the appropriate operational amplifier.

Returning now to FIG. 5, the microprocessor 34 is provided with a nonvolatile random access memory (NOVRAM) 36. The NOVRAM is preferably used to store factory setup data, e.g. nominal values for convergence are stored there during production. The microprocessor then uses this data as a starting point for convergence correction. The following listing is a specific example of a program which may be used in the practice of the invention. This listing is in assembly language for a Z80 microprocessor.

```
1            ;****************************************************
2            ;SUBROUTINE /INIT/.SETS UP PORT A AS OUTPUT,PORT B AS
3            ;UNLATCHED INPUT, AND ZEROES SCRATCHPAD(12 BYTES START
4            ;AT 2100H) AND ACCUMULATOR
5            ;INPUTS-NONE
6            ;OUTPUTS-A,SCRATCHPAD
7            ;USES-A,B,F,H,L
8            ;DESTROYS-A,B,F,H,L
9            ;CALLS-NONE
10           ;****************************************************
11                    ORG    1200H    ;
12 1200 3E0F   INIT:  LD     A,0FH    ;SET UP PORT A AS OUTPUT
13 1202 D382          OUT    (82H),A
14 1204 3EFF          LD     A,0FFH   ;SET UP PORT B AS INPUT
15 1206 D383          OUT    (83H),A  ;(BIT CONTROL MODE-ALL BITS INPUT)
16 1208 D383          OUT    (83H),A
17 120A 3E07          LD     A,07H    ;DISABLE INTERRUPTS FROM PORT B
18 120C D383          OUT    (83H),A
19 120E 3E00          LD     A,00H
20 1210 210021        LD     HL,2100H ;POINT TO BEGINNING OF SCRATCHPAD
21 1213 060C          LD     B,0CH    ;SET COUNT =12
22 1215 77     LP:    LD     (HL),A   ;STORE ZERO
23 1216 23            INC    HL       ;POINT NEXT
24 1217 10FC          DJNZ   LP       ;REPEAT UNTIL DONE
25 1219 C9            RET
26            ;
27            ;
29            ;
30            ;
31           ;****************************************************
32            ;SUBROUTINE /ANOUT/. SELECTS OUTPUT LINE AND SENDS 'B'
33            ;OUTPUT PULSES TO IT.
34            ;INPUTS-C:OUTPUT LINE
35            ;       B:NUMBER OF PULSES TO SEND
36            ;OUTPUT-PORT 80H
37            ;USES-A,B,C,F,H,L,2 STACK LEVELS:
38            ;DESTROYS-NONE
39            ;CALLS-NONE
40           ;****************************************************
41                    ORG    1220H    ;
42 1220 F5     ANOUT: PUSH   AF
43 1221 C5            PUSH   BC
44 1222 79            LD     A,C
45 1223 E607          AND    07H      ;ISOLATE 3 LSB'S
46 1225 F630          OR     30H      ;TURN ON BITS 4,5
47 1227 D380          OUT    (80H),A
48 1229 E3            EX     (SP),HL  ;WASTE 52 US TO WIDEN RESET PULSE
49 122A E3            EX     (SP),HL
50 122B E3            EX     (SP),HL
51 122C E3            EX     (SP),HL
52 122D E6CF   AN1:   AND    0CFH     ;SEND 'B' OUTPUT PULSES
53 122F D380          OUT    (80H),A  ;TURN OFF BITS 4,5
54 1231 F610          OR     10H      ;TURN ON BIT 4
```

```
55 1233 D380              OUT   (80H),A
56 1235 10F6              DJNZ  AN1        ;REPEAT UNTIL B=0
57 1237 C1                POP   BC
58 1238 F1                POP   AF
59 1239 C9                RET
60                    ;
61                    ;
62                    ;
63                    ;
64                    ;
65                    ;******************************************************
66                    ;SUBROUTINE /VSYNC/. WAITS UNTIL THE LEADING EDGE OF
67                    ;VERTICAL SYNC PULSE, THEN RETURNS
68                    ;INPUTS-BIT 7,PORT 81H
69                    ;OUTPUTS-NONE
70                    ;USES-A,F,1 STACK LEVEL
71                    ;DESTROYS-NONE
72                    ;CALLS-NONE
73                    ;******************************************************
74                          ORG   1240H
75 1240 F5           VSYNC: PUSH  AF
76 1241 DB81         VS1:   IN    A,(81H)    ;WAIT UNTIL BIT 7 IS HIGH
77 1243 E680                AND   80H
78 1245 28FA                JR    Z,VS1
79 1247 DB81         VS2:   IN    A,(81H)    ;WAIT UNTIL BIT 7 IS LOW
80 1249 E680                AND   80H
81 124B 20FA                JR    NZ,VS2
82 124D F1                  POP   AF
83 124E C9                  RET
84                    ;
85                    ;
87                    ;
88                    ;
89                    ;******************************************************
90                    ;SUBROUTINE /INCHK/. CHECKS BITS 0 AND 1 (LIGHT SENSOR
91                    ;IF ONE OF THESE BITS GOES LOW, THE CORRESPONDING BIT
92                    ;IN THE E REGISTER IS SET LOW. IF NEITHER BIT GOES LOW
93                    ;THIS ROUTINE TIMES OUT IN 10.5 MS AND RETURNS WITH
94                    ;ZERO IN THE E REGISTER
95                    ;INPUTS-BITS 0,1 OF PORT 81H
96                    ;OUTPUTS-E=03;NEITHER BLIP WAS FOUND
97                    ;        E=02;BLIP ON MAJOR AXIS WAS FOUND
98                    ;        E=01;BLIP ON MINOR AXIS FOUND
99                    ;        E=00;BOTH BLIPS FOUND
100                   ;USES-A,B,C,E,1 STACK LEVEL
101                   ;DESTROYS-A,E,F
102                   ;CALLS-NONE
103                   ;******************************************************
104                         ORG   1250H
105 1250 C5          INCHK: PUSH  BC
106 1251 010300             LD    BC,0003H
107 1254 DB81        INCK:  IN    A,(81H)
108 1256 A1                 AND   C
109 1257 4F                 LD    C,A
110 1258 E3                 EX    (SP),HL    ;WASTE 25 US
111 1259 E3                 EX    (SP),HL
112 125A 00                 NOP
113 125B 00                 NOP
114 125C 00                 NOP
115 125D 10F5               DJNZ  INCK
116 125F 59                 LD    E,C
117 1260 C1                 POP   BC
118 1261 C9                 RET
119                   ;
120                   ;
122                   ;
123                   ;
124                   ;
125                   ;******************************************************
126                   ;SUBROUTINE /CHVAL/. GENERATES OUTPUT VALUES IN THE B
                      ;REGISTER IN THE SEQUENCE 18H,17H,19H,16H,1AH,...,01H,
```

```
127                     ;IF THIS RANGE IS EXCEEDED, TRAPS TO ERROR ROUTINE
128                     ;LOCATED AT 2050H.STORES OFFSET FROM 18H IN SCRATCHPAD
129                     ;RAM FOR EACH OUTPUT LINE
130                     ;INPUTS-C:3 LSB'S SPECIFY WHICH RAM LOC. IS TO BE CHAN
131                     ;OUTPUTS-B
132                     ;USES-A,B,C,H,L,2 STACK LEVELS,SCRATCHPAD RAM
133                     ;DESTROYS-B
134                     ;CALLS-NONE
135                     ;****************************************************
136                             ORG   1270H
137 1270 F5             CHVAL:  PUSH  AF
138 1271 E5                     PUSH  HL
139 1272 79                     LD    A,C
140 1273 E607                   AND   07H         ;ISOLATE 3 LSB'S
141 1275 2621                   LD    H,21H       ;BUILD POINTER TO SCRATCHPAD RAM
142 1277 6F                     LD    L,A
143 1278 E5                     PUSH  HL          ;SAVE POINTER
144 1279 C606                   ADD   A,06H       ;ERROR MEMORY OFFSET
145 127B 6F                     LD    L,A
146 127C 7E                     LD    A,(HL)      ;GET ERROR
147 127D E1                     POP   HL          ;RETRIEVE POINTER
148 127E B7                     OR    A           ;TEST IT
149 127F 2805                   JR    Z,NEXT      ;IF NO ERROR, RESUME PROCESSING
150 1281 3E00                   LD    A,00H       ;ELSE, SET DISP=0
151 1283 C39312                 JP    STOR
152 1286 7E             NEXT:   LD    A,(HL)      ;GET OLD DISPLACEMENT FROM RAM
153 1287 CB7F                   BIT   7,A         ;CHECK THE SIGN
154 1289 2006                   JR    NZ,NEG      ;DON'T INCREMENT IF NEGATIVE
155 128B 3C                     INC   A
156 128C FE18                   CP    18H         ;OUT OF RANGE?
157 128E D45020                 CALL  NC,2050H    ;IF SO, CALL ERROR ROUTINE
158 1291 2F             NEG:    CPL   A           ;NEGATE (COMPLEMENT&INCREMENT)
159 1292 3C                     INC   A
160 1293 77             STOR:   LD    (HL),A      ;STORE NEW DISPLACEMENT IN RAM
161 1294 C618                   ADD   A,18H       ;ADD OFFSET
162 1296 47                     LD    B,A         ;SEND TO B
163 1297 E1                     POP   HL
164 1298 F1                     POP   AF
165 1299 C9                     RET
166                     ;
167                     ;
169                     ;
170                     ;
171                     ;****************************************************
172                     ;ROUTINE /ERROR/. SETS ERROR FLAG IN RAM BYTE
173                     ;INPUTS-HL POINTS TO 6 BELOW ERROR BYTE
174                     ;OUTPUTS-01H AT (HL+6)
175                     ;USES-A,H,L
176                     ;DESTROYS-A (RESTORED BY /CHVAL/)
177                     ;CALLS-NONE
178                     ;****************************************************
179                             ORG   2050H
180 2050 E5             ERROR:  PUSH  HL
181 2051 7D                     LD    A,L         ;BUILD PTR TO ERROR BYTE
182 2052 C606                   ADD   A,06H
183 2054 6F                     LD    L,A
184 2055 3E01                   LD    A,01H
185 2057 77                     LD    (HL),A      ;STORE ERROR FLAG
186 2058 E1                     POP   HL          ;RETRIEVE POINTER
187 2059 C9                     RET               ;RETURN TO /CHVAL/
188                     ;
189                     ;
191                     ;
192                     ;
193                     ;****************************************************
194                     ;MAIN PROGRAM /ACV/.
```

```
195              ;INPUTS-
196              ;OUTPUTS
197              ;USES-A,B,C,D,F,H,L,SCRATCHPAD,STACK
198              ;DESTROYS-ALL
199              ;CALLS-INIT,ANOUT,CHVAL,INCHK,VSYNC
200              ;*************************************************
201                       ORG   2000H
202  2000 CD0012  ACV:     CALL  INIT
203  2003 0E05    BEGIN:   LD    C,05H
204  2005 CD4012  CONT:    CALL  VSYNC      ;WAIT HERE UNTIL RETRACE
205  2008 CB43             BIT   0,E        ;TEST FOR MAJOR AXIS BLIP
206  200A C47012           CALL  NZ,CHVAL   ;IF NOT THERE, CHANGE DISP
207  200D CD2012           CALL  ANOUT      ;SET UP 4-POLE CURRENT
208  2010 0D               DEC   C
209  2011 CD4012           CALL  VSYNC      ;WAIT HERE UNTIL RETRACE
210  2014 CB4B             BIT   1,E        ;TEST FOR MINOR AXIS BLIP
211  2016 C47012           CALL  NZ,CHVAL   ;IF NOT THERE, CHANGE DISPLACEM
212  2019 CD2012           CALL  ANOUT      ;SET UP 4-POLE CURRENT
213  201C CD5012           CALL  INCHK      ;LOOK FOR BLIPS
214  201F 79               LD    A,C
215  2020 B7               OR    A
216  2021 28E0             JR    Z,BEGIN    ;IF LAST COLOR,START OVER
217  2023 0D               DEC   C 219  2025 18DE             JR    CONT       ;CONTINUE
220              ;
221              ;
222              ;
223              ;
224  2027                  END   ACV
```

SYMBOL TABLE

| | | | | | | | |
|---|---|---|---|---|---|---|---|
| ACV | 2000 | AN1 | 122D | ANOUT | 1220 | BEGIN | 2003 |
| CHVAL | 1270 | CONT | 2005 | ERROR | 2050 | INCHK | 1250 |
| INCK | 1254 | INIT | 1200 | LP | 1215 | MEMORY | M 0000 |
| NARG | 0000 | NEG | 1291 | NEXT | 1286 | STACK | S 0000 |
| STOR | 1293 | VS1 | 1241 | VS2 | 1247 | VSYNC | 1240 |

I claim:

1. A system for the automatic correction of centering errors in a cathode ray tube display, said display having a major axis and a minor axis perpendicular to one another, said system comprising:
   a first masked light sensor positioned on said major axis and a second masked light sensor positioned on said minor axis, said first and second light sensors being located outside the field of view of said display but within the scanned area;
   light blip generator means responsive to horizontal and vertical timing pulses supplied to said cathode ray tube display for unblanking the video circuits during the horizontal and vertical blanking intervals to thereby generate light pulses in the vicinities of said first and second light sensors; and
   microprocessor feedback controller means responsive to the outputs of said first and second light sensors and connected to centering circuits in said cathode ray tube display for iteratively generating correction signals to the centering circuits whenever no output is received from one or the other or both of said first and second light sensors.

2. The system according to claim 1 wherein said cathode ray tube display is a color display, said system further comprising switch means connected to the output of said light blip generator means and controlled by said controller means for sequentially providing unblanking signals to the red, green and blue video circuits, said controller means separately generating correction signals to the red, green and blue centering circuits.

3. The system according to claim 2 further comprising:
   a plurality of first light sensors arranged perpendicular to said major axis on one side of said cathode ray tube display, one of said first plurality of light sensors being positioned on said major axis;
   a plurality of second light sensors arranged perpendicular to said minor axis at the top of said cathode ray tube display, one of said second light sensors being positioned on said minor axis;
   a plurality of third light sensors arranged perpendicular to said major axis on the opposite side of said cathode ray tube display from said first plurality of light sensors; and
   a plurality of fourth light sensors arranged perpendicular to said minor axis at the bottom of said cathode ray tube display;
   said controller means being responsive to each of said plurality of light sensors for generating signals to correct the dynamic convergence of said cathode ray tube display.

4. The system according to claim 2 wherein said controller means comprises:

microprocessor means connected to receive outputs from said first and second light sensors and programmed to perform the iterative generation of said correction signals;

sample and hold means for storing correction signals for each of the red, green and blue horizontal and vertical correction circuits; and switched current source means controlled by said microprocessor means for selectively charging said sample and hold means.

* * * * *